United States Patent
Jana et al.

(10) Patent No.: US 10,264,035 B2
(45) Date of Patent: Apr. 16, 2019

(54) METHOD AND APPARATUS FOR ARCHITECTING MULTIMEDIA CONFERENCING SERVICES USING SDN

(71) Applicant: AT&T Intellectual Property I, L.P., Atlanta, GA (US)

(72) Inventors: Rittwik Jana, Montville, NJ (US); John F. Murray, Denville, NJ (US); Vijay Gopalakrishnan, Edison, NJ (US); Shu Shi, Secaucus, NJ (US); Bo Han, Bridgewater, NJ (US); Bo Yan, Brooklyn, NY (US); Lusheng Ji, Randolph, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 276 days.

(21) Appl. No.: 15/050,513

(22) Filed: Feb. 23, 2016

(65) Prior Publication Data
US 2017/0244767 A1    Aug. 24, 2017

(51) Int. Cl.
*H04L 29/06* (2006.01)
*H04L 12/18* (2006.01)
*H04L 12/725* (2013.01)

(52) U.S. Cl.
CPC ........ *H04L 65/403* (2013.01); *H04L 12/1818* (2013.01); *H04L 12/1827* (2013.01); *H04L 12/1863* (2013.01); *H04L 45/3065* (2013.01)

(58) Field of Classification Search
CPC .................. H04L 45/3065; H04L 65/1006
See application file for complete search history.

(56) References Cited

U.S. PATENT DOCUMENTS

| | | | |
|---|---|---|---|
| 8,873,398 B2 | 10/2014 | Kempf et al. | |
| 9,077,658 B2 | 7/2015 | Hamdi et al. | |
| 9,100,282 B1 | 8/2015 | Raps et al. | |
| 9,112,774 B2 | 8/2015 | Jocha et al. | |
| 9,167,501 B2 | 10/2015 | Kempf et al. | |
| 2004/0179036 A1* | 9/2004 | Teplov | G06F 3/1454 715/751 |
| 2008/0205403 A1* | 8/2008 | Akyol | H04L 45/7453 370/392 |

(Continued)

FOREIGN PATENT DOCUMENTS

| | | |
|---|---|---|
| CN | 104243240 A | 12/2014 |
| CN | 104580066 A | 4/2015 |

OTHER PUBLICATIONS

Tourrilhes, Jean, et al. "SDN and OpenFlow Evolution: A Standards Perspective." Computer 11 (2014): 22-29.

(Continued)

*Primary Examiner* — Barbara B Anyan (57) ABSTRACT

A multimedia conferencing service uses accessible-forwarding-plane network elements such as OpenFlow® controllers and OpenFlow®-enabled switches. A conferencing server receives a conference subscription request including a network address of a L2/L3 signaling server, and connects to an accessible-forwarding-plane controller to control an accessible-forwarding-plane switch. Flow tables and group tables are managed to classify traffic with minimum table usage and update frequency. Media channels are established between clients through the OpenFlow®-enabled switches, relieving bottlenecks at the conferencing server.

15 Claims, 10 Drawing Sheets

(56) References Cited

U.S. PATENT DOCUMENTS

| | | | |
|---|---|---|---|
| 2008/0276004 A1* | 11/2008 | Thomson | H04W 4/02 |
| | | | 709/244 |
| 2013/0124707 A1 | 5/2013 | Ananthapadmanabha et al. | |
| 2014/0313898 A1 | 10/2014 | Yae et al. | |
| 2014/0371880 A1 | 12/2014 | Lee et al. | |
| 2015/0002616 A1 | 1/2015 | Yoon et al. | |
| 2015/0062285 A1 | 3/2015 | Xu et al. | |
| 2015/0131651 A1* | 5/2015 | Tarricone | H04L 45/3065 |
| | | | 370/352 |
| 2015/0195745 A1 | 7/2015 | Farmanbar et al. | |

OTHER PUBLICATIONS

Egilmez, Hilmi E., S. Tahsin Dane, and K. Tolga Bagci. "OpenQoS: An OpenFlow controller design for multimedia delivery with end-to-end Quality of Service over Software-Defined Networks." Signal & Information Processing Association Annual Summit and Conference (APSIPA ASC), 2012 Asia-Pacific. IEEE, 2012.

Lara, Adrian, Anisha Kolasani, and Byrav Ramamurthy. "Network innovation using openflow: A survey." Communications Surveys & Tutorials, IEEE 16.1 (2014): 493-512.

\* cited by examiner

METHOD AND APPARATUS FOR ARCHITECTING MULTIMEDIA CONFERENCING SERVICES USING SDN

TECHNICAL FIELD

Embodiments of the present disclosure relate to multimedia conferencing services in a digital network. Specifically, the disclosure relates to the use of the group table feature of accessible-forwarding-plane switches to implement an efficient conferencing service architecture.

BACKGROUND

Modern Web-enabled multimedia conferencing systems relay the source video flows to all call participants through media conferencing servers. While that works well for small conference groups, as the conference size increases, the I/O bandwidth of the conferencing server becomes the bottleneck, which limits the scalability of the system, and eventually degrades conference quality of service (QoS).

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Presently disclosed is a multimedia conferencing service using software defined networks (SDN) that provides enhanced scalability and service orchestration. The technique decouples the data plane and the control plane, and establishes media channels on the fly using accessible-forwarding-plane switches instead of relaying them through the conferencing server. As used herein, an "accessible-forwarding-plane switch" and an "accessible-forwarding-plane controller" are network devices implementing a standard communications interface that allows access to and manipulation of the forwarding plane of the network device. The standard communications interface is defined between the control and forwarding layers of an SDN architecture. An example of such a standard communications interface is the OpenFlow® standard communications interface. While exemplary embodiments of the present disclosure utilize the OpenFlow® standard communications interface, those examples in no way limit the present disclosure to the use of that particular accessible-forwarding-plane communications interface.

The presently described service uses the group-based traffic forwarding capability of an accessible-forwarding-plane switch such as an OpenFlow® switch. The described service may be subscribed to by a wide range of multimedia applications, including multimedia conferencing, voice over Internet Protocol (VoIP), instant messaging (IM), and Web real time communications (WebRTC). Preliminary prototype evaluations show that the service as disclosed herein eliminates the I/O bottleneck at conferencing servers and scales efficiently.

The overall vision is to simplify the deployment of layer 7 applications. To that end, using the disclosed multimedia conferencing service as an example, a unified framework is created that advertises generic data plane capabilities as service APIs, which can be subscribed to by applications for composing services with both end hosts and network devices.

In particular, presently disclosed are a method, computer readable storage device and multimedia conferencing server for providing a multimedia conferencing service. To provide the service, the conferencing server receives a conference subscription request for the multimedia conferencing service including a network address of a L2/L3 signaling server. The conferencing server connects to an accessible-forwarding-plane controller to control an accessible-forwarding-plane switch. The conferencing server then learns a physical port of the accessible-forwarding-plane switch to which a conference participant client is connected based on packets from the client forwarded by the switch to the accessible-forwarding-plane controller and to the L2/L3 signaling server.

The conferencing server then establishes a signaling channel through the L2/L3 signaling server, and negotiates a media channel using the signaling channel. The conferencing server then causes the accessible-forwarding-plane switch to enforce a data plane policy wherein conference media traffic is forwarded to all conference participant clients and non-conference traffic is forwarded through a L2/L3 switching port.

A key motivation for SDN is that it enables network programmers to efficiently manage the underlying network that would otherwise be difficult to realize using existing control-plane mechanisms. Application developers, on the other hand, do not typically have the expertise (e.g. network topology, routing, table management) to design applications that use the various programmable features offered by SDN. Traditionally, application developers worry about the logic of the application they are designing and expect the network to efficiently transfer the packets to/from the applications or end points. That strong separation between the application layer and the network layer is becoming fuzzy with the prominence of network programmability. The present disclosure investigates how a smart application can be redesigned to leverage advanced data plane capabilities with the objective of maximizing scale and efficiency.

In a multimedia conferencing system, forwarding the video stream of every conference participant to all other participants is a basic function of a conferencing server. Most modern conferencing systems comprise signaling channels 156, 157, 158 and media channels 161, 162, 163 as depicted in FIG. 1b. The signaling channel coordinates the conference by exchanging control messages between the clients 153, 154, 155 and the signaling servers 170, which can be used to manage sessions, notify errors, exchange codecs and media types. The media channel is negotiated apriori as part of session initiation through the signaling channel for a client to send and receive multimedia content. As the number of conferencing participants grows, the conferencing server 180 can easily become a bottleneck to forward all streams due to the insufficient I/O bandwidth. The software solution is to selectively forward a subset of streams to all participants; e.g., only the streams of active speakers.

Such a challenge, however, can be alleviated by leveraging the SDN capabilities that modern networks can provide. Recent OpenFlow® specification supports programmable group-based traffic forwarding. By programming rules and groups for fine grain classification and forwarding, media channels can be deployed on-the-fly through OpenFlow®-enabled switches without having to pass through the conferencing server. Since the switching fabric has high data plane throughput, the I/O bottleneck of the conferencing server is relieved.

The presently disclosed system advertises the group-based forwarding capability of OpenFlow®-enabled or other accessible-forwarding-plane switches. A multimedia conferencing system is modified to subscribe to the present service, to downshift the stream forwarding function to switches, to change forwarding policies on-the-fly by interacting with the accessible-forwarding-plane controller through the disclosed service. The performance and scalability of the modified multimedia conferencing system is significantly improved.

Technically, the presently disclosed system resolves two major challenges: zero disturbance with non-conferencing traffic, and minimized table usage. As an application level service, the disclosed system is unaware of the existing traffic in the network. It must therefore ensure that the rules and groups deployed to support conferences do not affect the forwarding behavior of nonconferencing traffic. Meanwhile, since the switch table memory resource is shared with other applications, the memory used to implement conferencing should be minimized so that more application instances may be composed using SDN.

The presently disclosed multimedia conferencing service is architected with SDN to overcome those challenges. By offloading the media channel deployments from the conferencing server to OpenFlow®-enabled or other accessible-forwarding-plane switches, the scalability and management of the system is improved. The service is designed with service APIs to advertise the group-based forwarding capability of the accessible-forwarding-plane switches to applications without requiring detailed network information. The disclosed system implements conferencing instances with zero disturbance to existing traffic in the network, while efficiently using the table memory in the switches.

The presently disclosed system has been evaluated in a test implementation using Open vSwitch™ virtual switch, Ryu™ controller and Jitsi Videobridge™ selective forwarding unit. The preliminary results show that the disclosed system helps scale multimedia conferencing with more clients supported, and improves the conferencing QoS significantly. The disclosed multimedia conferencing system may be generalized towards an approach of 'advertising SDN data plane capabilities as service APIs'. Following that approach, more applications are expected to benefit from SDN for improved performance.

Existing multimedia conferencing techniques exhibit significant scalability and performance challenges. For example, traditional IP multicast multimedia conferencing has been suggested using IP multicast. IP multicast, however, faces configuration challenges which prohibits a widespread commercial deployment to support clients universally.

Figure 1A:
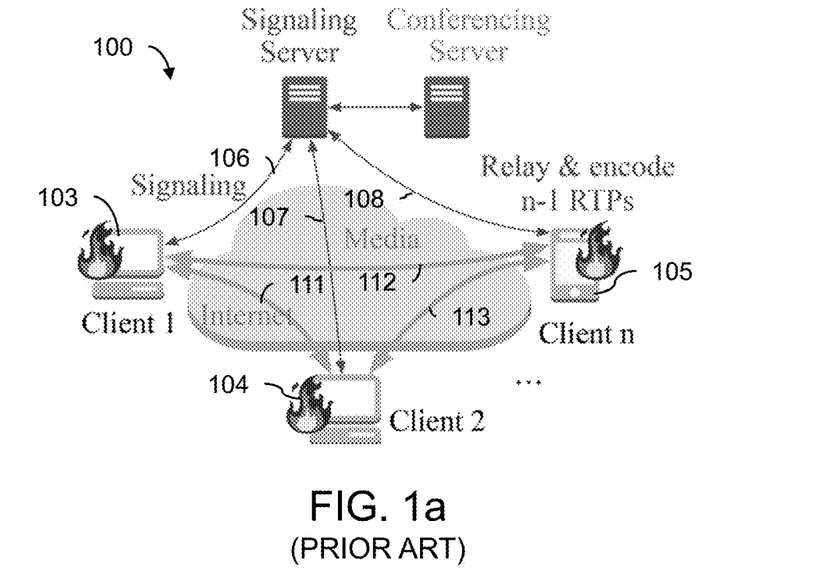
FIG. 1a is a block diagram showing an existing peer-to-peer conferencing architecture.
Figure 1B:
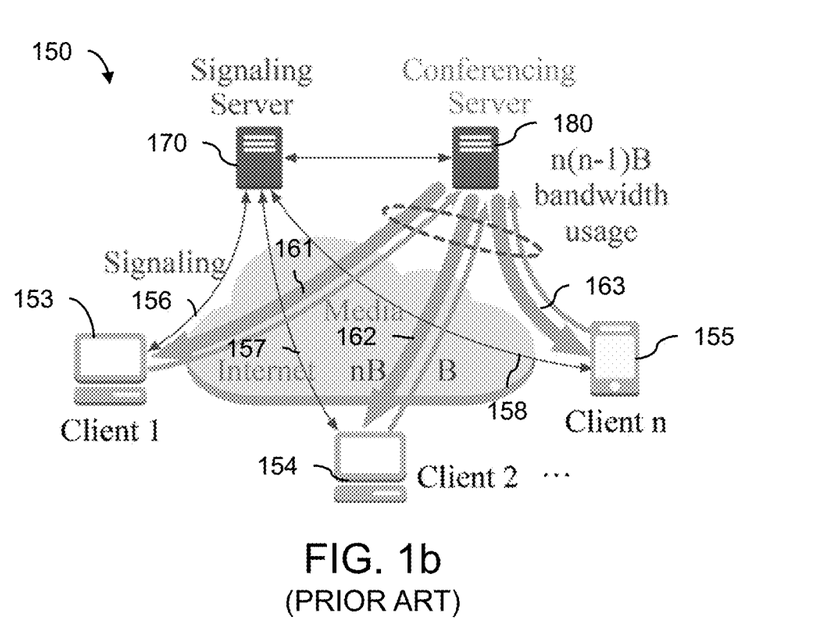
FIG. 1b is a block diagram showing an existing media bridge conferencing architecture.

The Skype® chat application has popularized conferencing via an overlay peer-to-peer (P2P) network 100, shown in FIG. 1a. Media channels 111, 112, 113 connect the clients 103, 104, 105 directly. With all the processing being pushed to the clients, however, it is difficult to deliver high quality conferencing services to a large number of clients. Each client creates multiple media streams to its peers, which can congest the uplink bandwidth of clients. Further, depending on the measured bandwidth between each peer, video may need to be encoded differently on each media channel, which can burden the CPUs at the client devices.

To achieve better scalability, enterprises generally employ a media bridge architecture 150, shown in FIG. 1b, where the conferencing server 180 deployed within the enterprise network or a cloud acts as a 'bridge' for relaying media channels 161, 162, 163. While that strategy simplifies the complexity of clients, media bridge conferencing suffers from an I/O bottleneck at the conferencing server 180 as noted above. The aggregate bandwidth usage scales by the square of the group size.

To address those issues, the disclosed multimedia conferencing approach uses SDN and the group-forwarding capability of accessible-forwarding-plane switches. For example, OpenFlow® version 1.1 and above provides the capability to relay traffic using multiple flow tables and the group table in an OpenFlow®-enabled switch. The OpenFlow® controller can dynamically program rules in the flow tables and groups in the group table. Recent switch products can handle 12K flow entry updates per second, providing real-time update capability. Each rule comprises matching fields to match against packets, and an action to perform traffic forwarding. To forward the matched traffic to multiple destinations, the action is set as forwarding to a certain group. Each group contains multiple actions, which direct the traffic to different destinations.

Figure 2A:
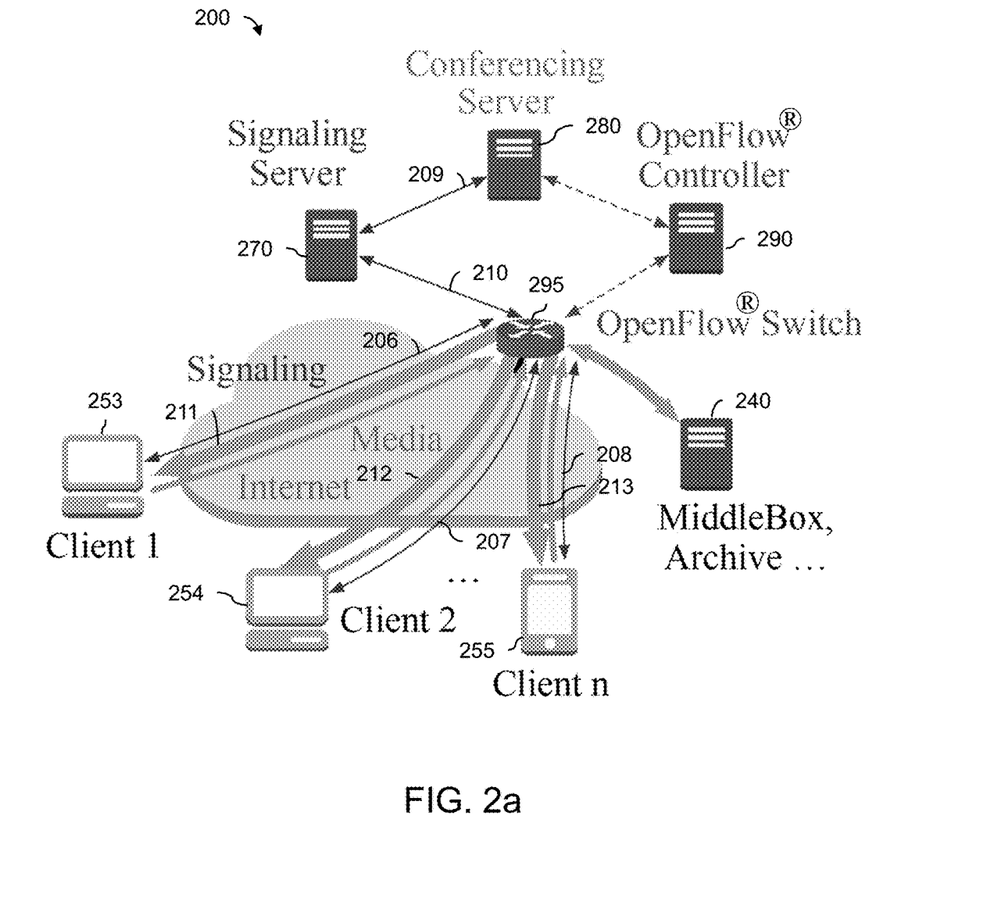
FIG. 2a is a block diagram showing an SDN multimedia conferencing architecture according to aspects of the present disclosure.

The disclosed multimedia conferencing system advertises the group-based forwarding capability of accessible-forwarding-plane switches such as OpenFlow®-enabled switches. Application developers can therefore discover and leverage that capability in designing a conferencing application. The architecture 200 of the disclosed system, depicted as in FIG. 2, includes signaling channels 206, 207, 208, 209, 210 established using conventional non-OpenFlow® L2/L3 networking. Different from existing architectures, the conferencing server 280 now subscribes to the disclosed conferencing service. The conferencing server 280 then connects with the OpenFlow® controller 290 and establishes the media channels 211, 212, 213 using OpenFlow®-enabled switches 295 or other accessible-forwarding-plane switches.

That design benefits multimedia conferencing in two ways. First, from the performance perspective, the I/O bottleneck at the conferencing server 280 is relieved. Only the signaling traffic, which amounts to very little even for coordinating large conference group sizes, is processed by the conferencing server. Since the OpenFlow®-enabled switch has high data plane throughput, decoupling the media traffic from the conferencing server in that manner at the switch can maintain a high QoS. Second, from the management perspective, the conferencing application can be orchestrated with other services 240. For instance, traffic can now be dynamically chained through other network functions such as media transcoding, intrusion detection and data archiving.

As a proof of concept, in the present disclosure, conferencing service deployment is considered in a LAN environment. The gateway switch of the conferencing server 280 and signaling server 270 is an OpenFlow®-enabled switch, which supports hybrid Open-Flow® operations and conventional ethernet operations including L2 switching, VLAN isolation, and L3 routing. In that setup, all the conferencing traffic traverses through the OpenFlow®-enabled switch 295. The entire design is made transparent to the clients 253, 254, 255, and the upgrades are only applied at the service provider edge, which simplifies service deployments.

In embodiments, multiple local groups may be trunked. For example, as demonstrated by the architecture 201 shown in FIG. 2b, clients 264, 265 comprise a local group and are connected to a local switch 260 via media and signaling channels 262, 263. A trunk channel 261 connects the two switches 260, 295 across a wide area network 219 such as the Internet.

Figure 2B:
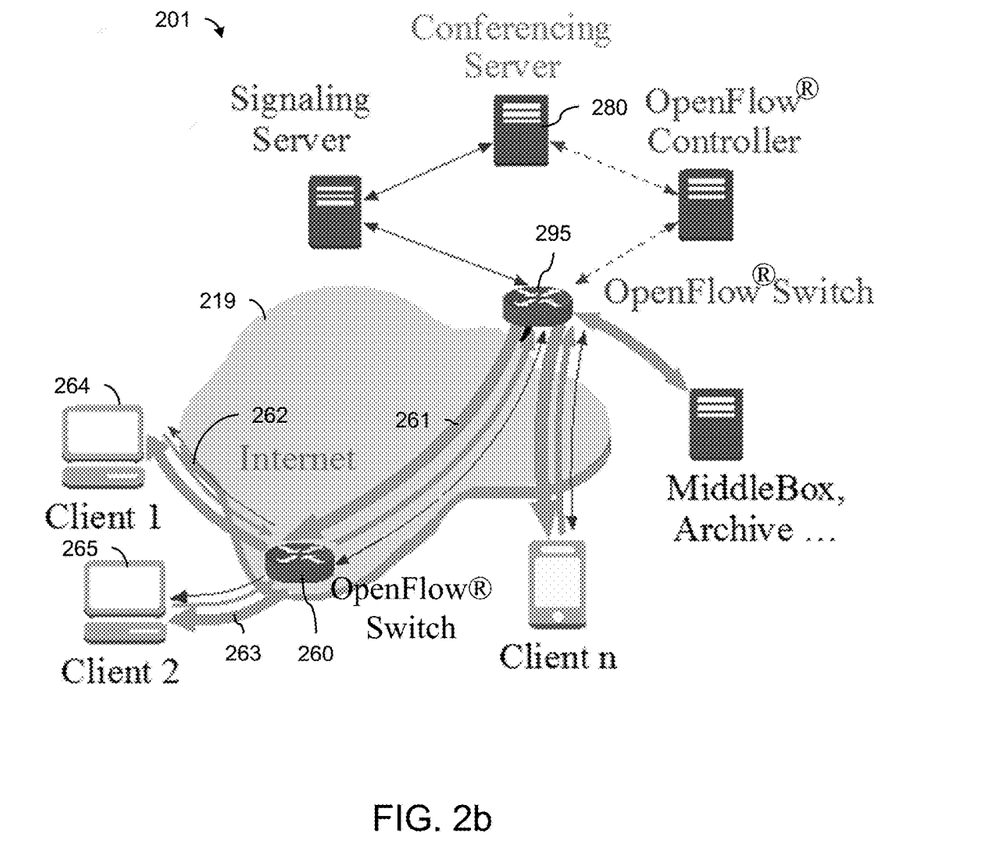
FIG. 2b is a block diagram showing an SDN multimedia conferencing architecture according to other aspects of the present disclosure.

Both the local switch 260 and the switch 295 may be accessible-forwarding-plane switches such as OpenFlow®-enabled switches. There may be intelligence at the switches 260, 295 so that full replication of all media is done at the local switch 260, while across the wide area network 219, where multiple local switches such as switch 260 are forwarding multimedia, only selected streams are forwarded as per policies policies set forth by the conferencing system, or by active speaker detection.

Unencrypted streams were used in the example implementation for the sake of simplicity. The work may be extended to support encryption, more general network topologies and richer application scenarios as discussed below.

Figure 3:
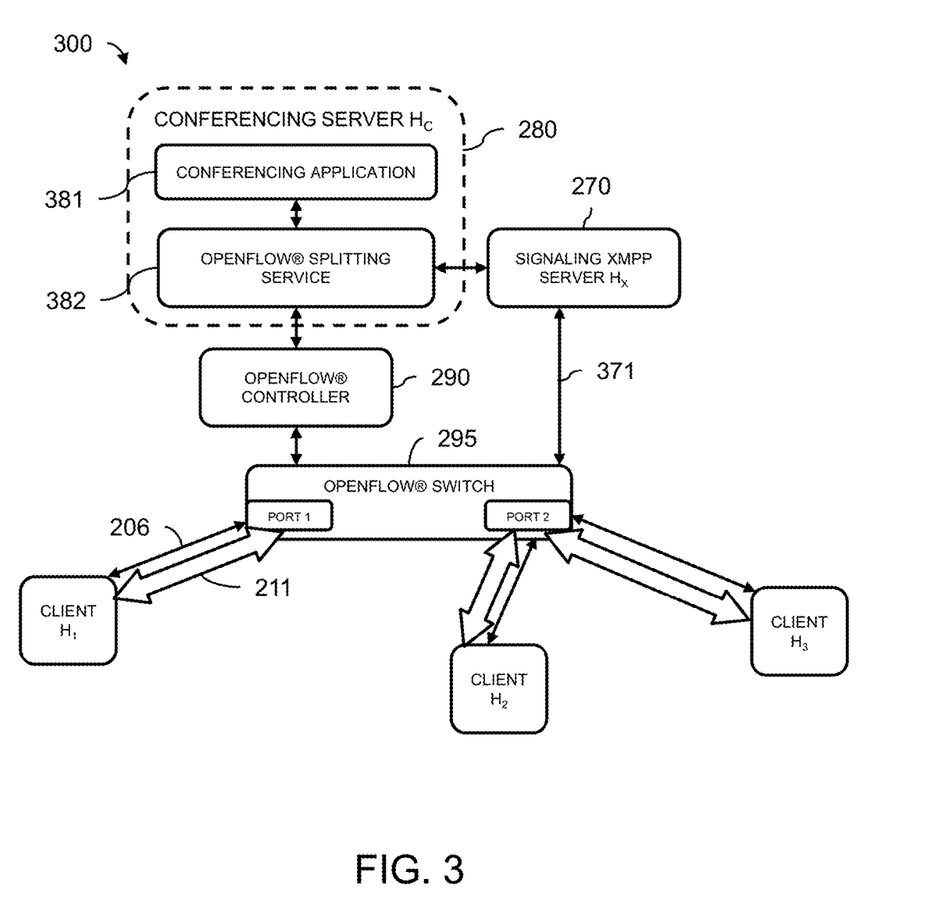
FIG. 3 is a block diagram showing workflow of a multimedia conferencing system according to aspects of the present disclosure.
Figure 4:
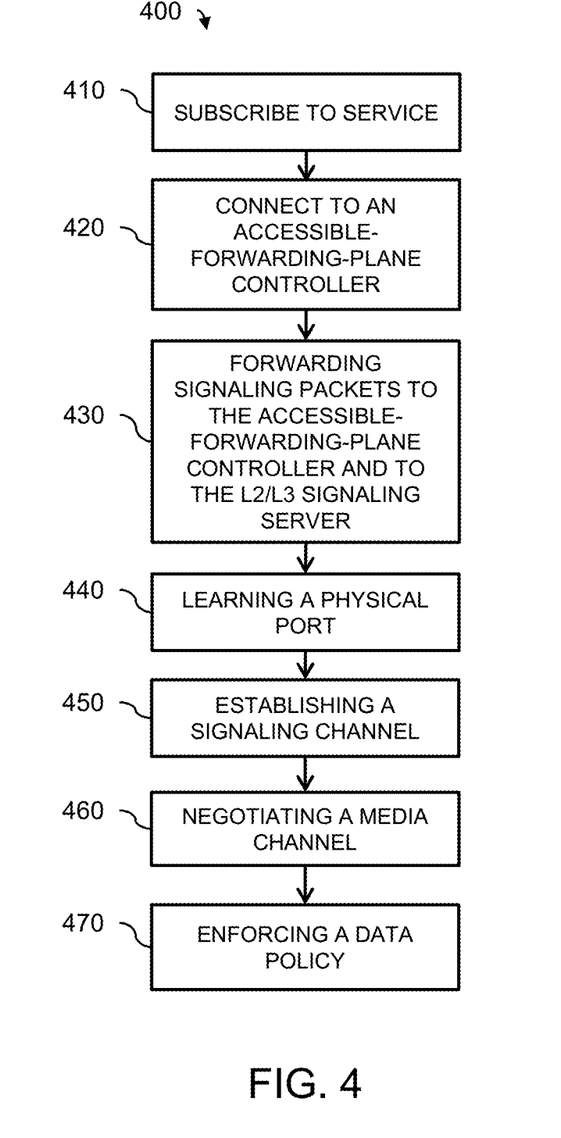
FIG. 4 is a flow chart showing method for multimedia conferencing according to aspects of the present disclosure.

The workflow of the presently disclosed multimedia conferencing system is described with reference to FIGS. 3 & 4. The system 300 of FIG. 3 depicts an example conference with three clients $H_1$, $H_2$, $H_3$. The flow chart 400 of FIG. 4 shows a method performed by the system 300.

The conferencing application 381 (FIG. 3) is co-located in the conferencing server 280 with an accessible-forwarding-plane splitting service such as an OpenFlow® splitting service 382. The conferencing application 381 first subscribes (operation 410 of FIG. 4) to the splitting service 382 by specifying the signaling protocol (e.g., XMPP), the IP address of the signaling server, the media channel type (e.g., IP, UDP, RTP), and the selective forwarding policy (e.g., all-to-all in each conference). Note that applications do not require any detailed network information. With service subscribed, the service 382 connects (operation 420) to the designated accessible-forwarding-plane controller 290 to manage the accessible-forwarding-plane switch 295, and interacts with the signaling server 270. In this example, it is assumed that clients $H_2$ and $H_3$ are already in a conference, and a new client $H_1$ is joining the conference. The new signaling packets are forwarded both to the controller 290 and to the non-accessible-forwarding-plane L2/L3 switching port via the signaling service 270. That enables the service 382 to learn the physical port connected to the new client $H_1$ for later media channel setup (operation 440). In the example, the new client $H_1$ resides at physical port 1 of the switch 295.

The signaling channel 371, 206 is then established through the L2/L3 network (operation 450). The conferencing service 382 then negotiates the media channel 211 through signaling (operation 460), and deploys it at the accessible-forwarding-plane switch (e.g., OpenFlow®-enabled switch) 295.

Following that workflow, the data plane policies are implemented (operation 470). In one example embodiment, those policies include:

policy i. New signaling packets are forwarded to both the accessible-forwarding-plane controller and the L2/L3 switching port.

policy ii. Established signaling traffic is forwarded through the L2/L3 switching port.

policy iii. The conference media traffic is forwarded to all the clients in the same conference.

policy iv. Non-conferencing traffic is forwarded through the L2/L3 switching port.

Two major technical problems must be resolved in managing the switch tables to implement the above data plane policies. First, the data plane policies should be implemented with zero disturbance to the forwarding behavior of nonconferencing traffic in the network. Since the disclosed conferencing service sits at the application level, the existing non-conferencing traffic or the table configuration of the accessible-forwarding-plane switch is invisible. To ensure that other services are undisturbed, the rules and groups generated by the conferencing service must be carefully handled. This shares goals similar those of network verification. Since channels must be established or updated in real time, verification engines cannot be relied on to check the policies due to latency. By crafting the format of rules and groups, the disclosed conferencing service achieves verification-free with correctness.

A second technical problem to be resolved is that table usage and update frequency must be minimized. Note that the table memory and the control channel bandwidth are limited for accessible-forwarding-plane (OpenFlow®) switches, especially considering that the disclosed conferencing service is sharing the resource with other services. By optimizing the resource consumed, it is possible for the system to support more application instances, such as conferences, at the same time.

Figure 5:
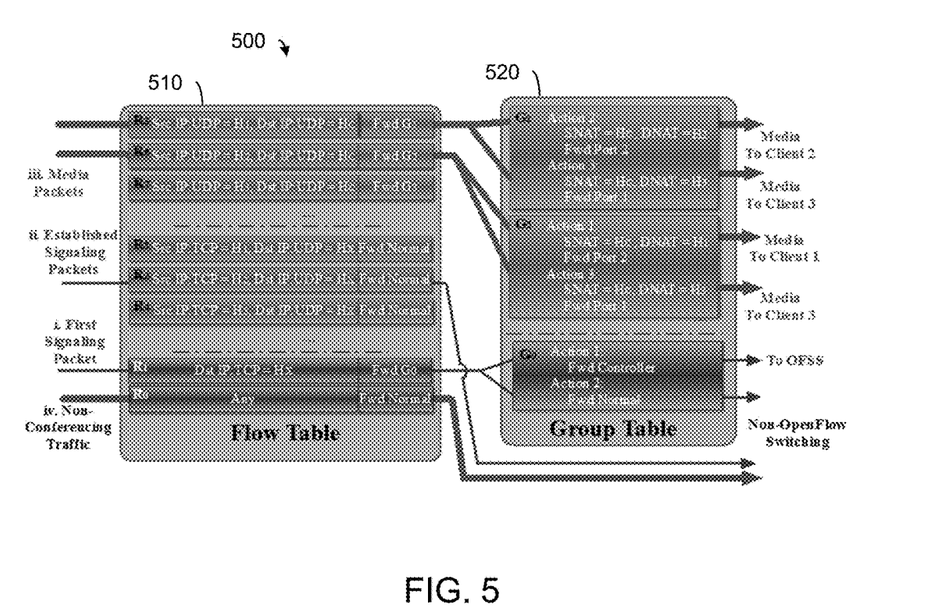
FIG. 5 shows routing tables and group tables of an accessible-forwarding-plane switch according to aspects of the present disclosure.

A straightforward table management implementation 500 to accomplish the above goals will now be described with reference to the switch tables shown in FIG. 5. Specifically, the straightforward implementation uses a single flow table 510 and a group table 520. The basic idea of the straightforward implementation is to configure exact rules to classify the traffic matching each policy, and forward the media traffic to corresponding groups. The example implementation 500 is used to explain the concept.

In the tables, certain entries are statically installed, while others need to be updated dynamically when a client joins or departs. In the straightforward table management implementation 500, rules $R_2$, $R_3$, $R_4$, $R_5$, $R_6$ and $R_7$ and groups $G_1$ and $G_2$ are dynamic. The dynamic rules have higher priority than the static rules.

Rules $R_0$, $R_1$ and group $G_0$ are statically installed for policy i and policy iv as set forth above and shown in the left of the implementation 500. The default rule $R_0$ matches all nonconferencing traffic, and forwards it using conventional L2/L3 switching by specifying the action as 'NORMAL.' Rule $R_1$ matches every new XMPP signaling packet and forwards it to group $G_0$. $G_0$ directs it to both the controller and the L2/L3 switching port. By learning from the PacketIn message captured at the controller, the messaging service records the physical port connected to the new client. Meanwhile, the new XMPP packet forwarded through L2/L3 network sets up the signaling channel.

The remaining rules $R_2$, $R_3$, $R_4$, $R_5$, $R_6$ and $R_7$ and groups $G_1$ and $G_2$ are deployed dynamically for policy ii and policy iii. After the signaling channel is established, a flow entry is installed to avoid further PacketIn messages to be sent to the controller. In the example, rules $R_2$, $R_3$, $R_4$ classify the 5-tuple of the established signaling channel, and direct them to L2/L3 network to fulfill policy ii. To deploy the media channel negotiated through signaling, each client has a rule installed to classify the 5-tuple of the media channel, and to direct the packets to the designated group. Each group applies all the actions that forward the traffic to the corresponding destinations (policy iii). Here the ports to forward are previously learned from the new signaling packets. In the example, the media traffic from client $H_1$ matches rule R5 and gets forwarded to clients $H_2$ and $H_3$ through ports 2 and 1, respectively. To achieve transparency to clients, source network address translation (SNAT) and destination network address translation (DNAT) are applied to set the source as the conferencing server $H_C$ and the destination to each client. In that way, upgrades are applied only at the provider side, and both a conventional media bridge and the disclosed conferencing service can be flexibly supported.

By composing exact entries, the straightforward implementation 500 realizes the data plane policies with zero disturbance with non-conferencing traffic. However, it costs a total of 2N flow entries and N group entry for N clients, which may be considered inefficient in table usage. Every client arrival or departure triggers two rule updates and multiple group updates, which can throttle the control channel of the switch.

Figure 6:
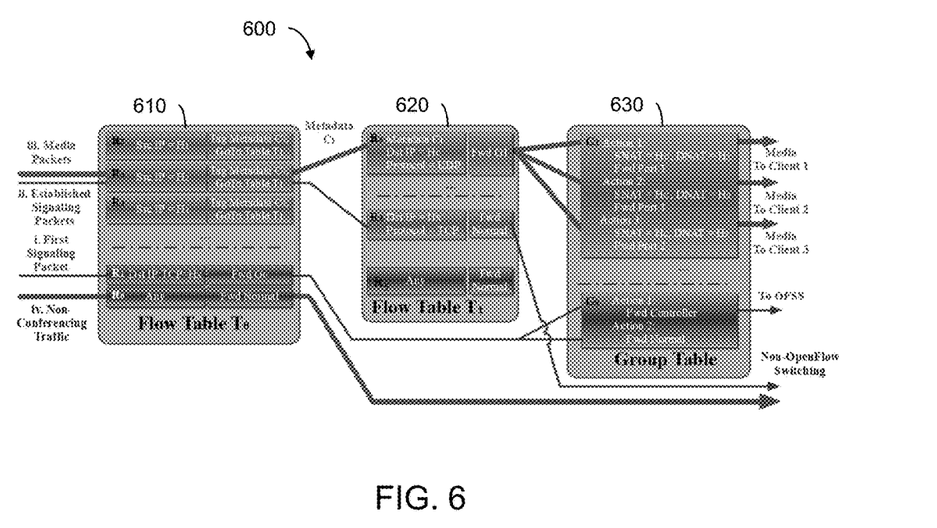
FIG. 6 shows routing tables and group tables of an accessible-forwarding-plane switch according to alternative aspects of the present disclosure.

A resource efficient table management implementation 600 will now be described with reference to the switch tables shown in FIG. 6. The resource efficient table management implementation 600 is an alternative implementation that minimizes table usage and update frequency. The basic idea of the resource efficient implementation is to leverage the flow table pipeline and metadata to decouple the classification of different fields. OpenFlow® supports pipeline processing of packets across multiple flow tables. Packets can match multiple rules at different tables. Metadata is a register attached to each packet to carry information across the tables. A rule may tag the metadata of the matched packets, which can be later used in the next table for classification. Note that the metadata does not change the packets, and will be removed before packets are sent to the output ports of the switch. In this implementation, two flow tables 610, 620 are used in the pipeline.

As in the previously described implementation 500, the rules $R_0$, $R_1$, $R_5$ and the group $G_0$ are statically installed for policy i and policy iv. In the flow table 610, the source IP address is classified for traffic from known clients. The metadata is tagged with the conference ID to identify that all three clients are in the same conference $C_1$. Traffic from clients in other conferences is tagged with different metadata. In the flow table 620, Rule $R_6$ matches the media packets carrying metadata $C_1$ destined to the conferencing server $H_C$, and directs them to group $G_1$ (policy iii). The established signaling traffic and non-conferencing traffic are forwarded through non-accessible-forwarding-plane switching (non-OpenFlow® switching) (policy ii and policy iv). In the group table 630, a single group is generated for each conference, which forwards the traffic to all the clients in the conference. Note that here the media traffic is sent back to the origin, which is considered as an overhead. In a large conference, trading the bandwidth overhead for a smaller number of group entries is considered to be worthwhile. The played back traffic can be used at clients to evaluate media channel quality.

Through memory efficient table management, the implementation 600 compresses the flow table usage to N+C, and the group table usage to C, where N is the number of clients and C is the number of conferences. For each client arrival or departure, only one rule and one group need be updated.

Figure 7A:
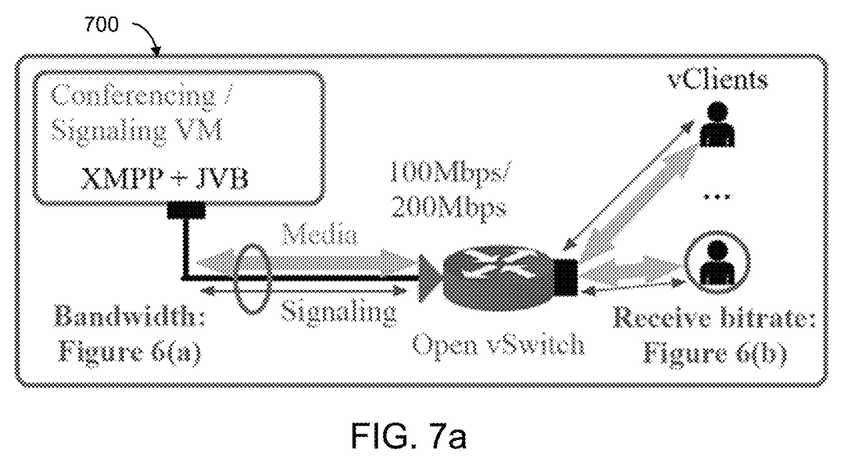
FIG. 7a shows a test bed set-up used to evaluate a known conferencing system.
Figure 7B:
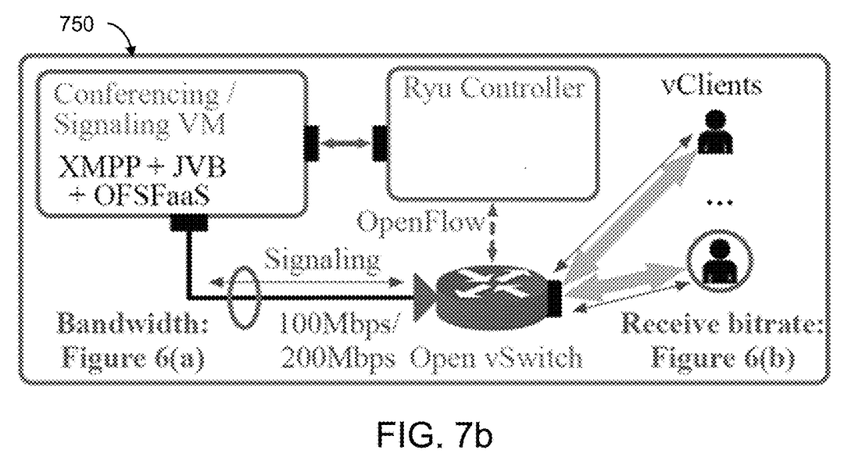
FIG. 7b shows a test bed set-up used to evaluate a system according to aspects of the present disclosure.

The presently disclosed service was tested by building a multimedia conferencing prototype using Jitsi VideoBridge™ (JVB) as depicted in the setup 750 of FIG. 7*b*. JVB is an open source selective forwarding unit supporting multimedia conferencing, VoIP, IM and WebRTC. The SDN environment is enabled by Open vSwitch™ and Ryu™ controller. The signaling server, the conferencing server and the OpenFlow® controllers are deployed as VMs in a same physical machine.

In a conventional JVB setup 700, shown in FIG. 7*a*, JVB is deployed at the conferencing/signaling VM to support the virtual clients. The Open vSwitch™ is run in traditional L2/L3 modes. The media traffic from all virtual clients are relayed through the conferencing/signaling VM. In the accessible-forwarding-plane-enabled JVB setup 750, shown in FIG. 7*b*, the Open vSwitch™ is controlled by the Ryu™ controller. JVB has the multimedia conferencing service control the setup of media channels through the Ryu controller. Therefore only the signaling traffic flows through the I/O of the conferencing/signaling VM. To evaluate scalability, in both systems the I/O bandwidth of the conferencing/signaling VM is rate limited at 100 Mbps or 200 Mbps for each conference. The group size of each conference is varied to evaluate the scalability of both conferencing architectures. In any case, conferences with less than 10 clients were evaluated as CPU and memory can bottleneck the performance in a virtual environment.

Figure 8A:
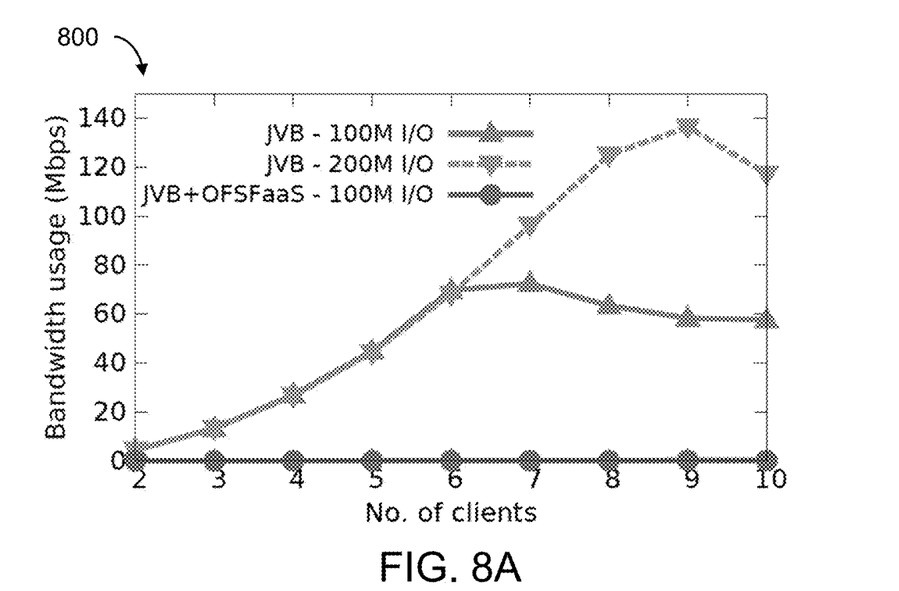
FIG. 8a is a graph showing I/O bandwidth usage of a conferencing server according to aspects of the present disclosure.

The average I/O bandwidth used at the conferencing/signaling VM is depicted in the graph 800 of FIG. 8*a*. For conventional JVB, the bandwidth usage initially increased by the square of the group size. With 100 Mbps I/O rate limit, bandwidth usage starts to smooth out at 70% utilization. As JVB senses packet loss at the media channel, it initiates rate control to lower the video quality. With a 200 Mbps rate limit, rate control occurs at around 65% utilization. By comparison, the presently disclosed conferencing service only has signaling traffic reach the conferencing/signaling VM, which consumes a tiny I/O bandwidth.

Figure 8B:
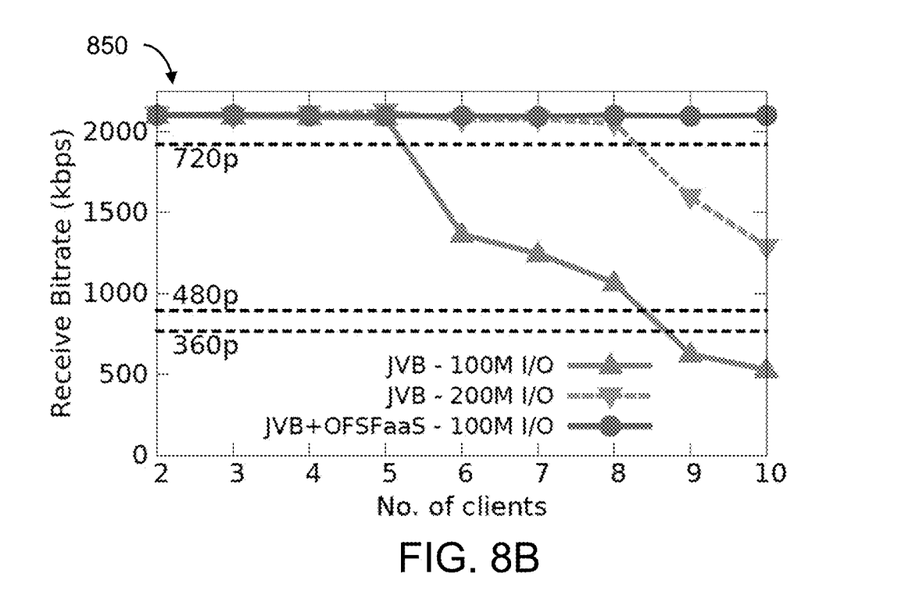
FIG. 8b is a graph showing average bitrate of clients using a conferencing service according to aspects of the present disclosure.

The receive bitrate at the client shows consistent results in the graph 850 of FIG. 8*b*. For conventional JVB, initially it supports a bitrate of 2.1 Mbps, which supports an advertised resolution of 720p. However, the bitrate drops intensely when more clients join in. With 100 Mbps I/O at the conferencing server, the receive bitrate drops to 500 kbps when there are ten clients in a conference, which fails to supports a 360p resolution. With 200 Mbps I/O, the performance also starts dropping with more than 8 clients. By comparison, the accessible-forwarding-plane-enabled JVB achieves a steady bitrate of 2.1 Mbps. The results prove that the I/O bottleneck at the conferencing server is relieved, and indicate a support for large number of clients.

Also compared was the service setup time for new clients between conventional JVB and accessible-forwarding-plane-enabled JVB. It was found that the channel negotiation dominates the latency, while the table update time in Open vSwitch is negligible.

Figure 9:
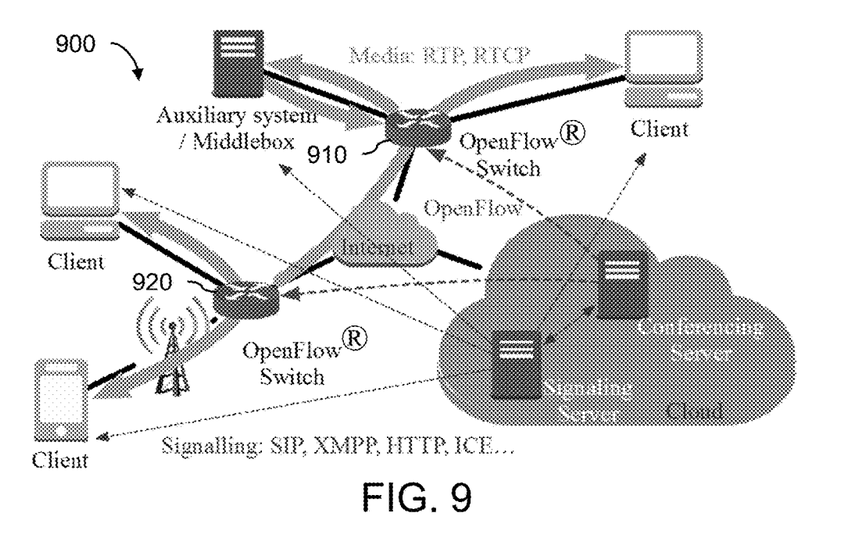
FIG. 9 is a network diagram showing network-wide deployment of a multimedia conferencing system according to aspects of the present disclosure.

In the above discussion, the feasibility of a conferencing service using accessible-forwarding-plane network elements was verified using a single OpenFlow®-enabled switch. It is possible to extend the disclosed conferencing service to network-wide environments with multiple accessible-forwarding-plane-enabled switches 910, 920, as shown in the network 900 of FIG. 9. Several challenges are presented by such a general network environment.

Traffic engineering is more complex in an accessible-forwarding-plane-enabled overlay network. In the multi-switch scenario, the OpenFlow®-enabled switches form an overlay network for selective forwarding. The routing can be optimized on demand to avoid congested paths and guarantee high QoS for multimedia traffic.

Table usage should be optimized. With multiple switches, there is more flexibility to optimize table usage. For instance, the conference traffic between two switches (e.g. two distant groups in NYC and LA joining the same conference session) can be trunked in one bundle before being replicated at the edge. The table usage of the switches can be load balanced.

Security in the conferencing service must be addressed. Today's conferencing services generally encrypt the media traffic. In a normal Jitsi™ conference, clients exchange key information with the conferencing server, and the media channels are encrypted using Secure RTP protocol. In the disclosed conferencing service, however, the traffic must be decrypted and then reencrypted by the OpenFlow® switch before being forwarded, which breaks normal encryption. To enable secure conferencing, an encrypted key transport (EKT) for secure RTP may be used. In such a solution, a shared/common key is negotiated among all clients in the same conference for media channels.

The presently disclosed conferencing service is a special case of the general concept of advertising SDN data plane capabilities as services. While much of the SDN research has focused on creating network management platforms, data plane capabilities are barely advertised directly to Layer 7 application developers. Today's SDN programming platforms can be classified into three main strands: OpenFlow® controllers, network abstraction, and network programming languages (NPL). OpenFlow® controllers such as Beacon™ and Ryu™ provide implementations of OpenFlow® protocols to directly control OpenFlow®-enabled switches. However, designing the flow table of each switch individually is beyond the scope of typical application developers. A network abstraction layer provides a more simplified view to network programmers, and automatically maps the abstracted network onto physical networks. However, programming the virtual switches still requires application developers to handle network devices explicitly. NPLs such as Maple and Pyretic provide a declarative way of specifying data plane policies which reduces the complexity of table management. However, using NPL still requires intricate network details (e.g. the physical ports to forward packets at each hop). Due to the above mentioned constraints, most applications today are developed agnostic to the data plane capabilities. Similarly, the lack of visibility to application logic by the network management layer also creates problems such as maintaining consistent updates and policy verifications. Working groups are just getting started for providing application level SDN APIs. For example, the Network Intent Composition (NIC) project in OpenDaylight suggests application developers to specify the 'intent' for network behaviors. PANE provides applications with APIs to reserve bandwidth, control access and perform health monitoring of the underlying network.

Figure 10:
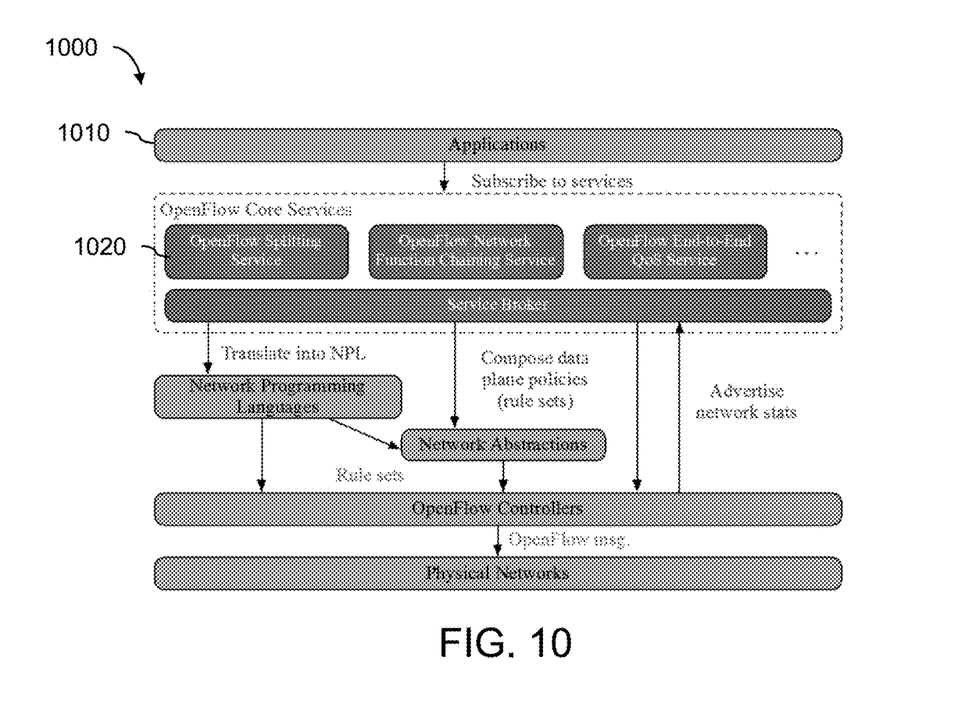
FIG. 10 is a architectural diagram showing advertising data plane capabilities as services according to aspects of the present disclosure.

Different from a top-down approach to specify application intent, the presently disclosed system seeks to discover and advertise various data plane capabilities (e.g. selective forwarding, measurement, traffic steering) via service APIs to Layer 7 applications, as illustrated by the system 1000 of FIG. 10. Applications 1010 can subscribe to one or multiple services without knowledge of network details. Layer 7 developers have the freedom to compose multimedia applications using both conventional feature servers at the application layer (e.g. multimedia content analysis like face detection) or using SDN data plane capabilities (e.g. video packet replication and forwarding). In a network deployment where not all switches are OpenFlow® capable, a hybrid architecture may be employed comprising both conventional media bridges and accessible-forwarding-plane-enabled conferencing services. Additional approaches may be realized for building scalable multimedia applications/services using SDNs.

The hardware and the various network elements discussed above comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The above disclosure presents a novel and alternative approach to a scalable multimedia conferencing service using SDN. The group-based traffic forwarding capability of OpenFlow® was exposed as a service API for application developers. The implementation shows that this approach helps scale multimedia conferencing significantly while at the same time keeping application development simple. That design may be extended to more general network scenarios, building a framework to discover and advertise various data plane capabilities for application developers to compose multimedia services.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method, comprising:
    by a conferencing server, receiving a conference subscription request for a multimedia conferencing service including a network address of a L2/L3 signaling server;
    by the conferencing server, connecting to an accessible-forwarding-plane controller to control an accessible-forwarding-plane switch, whereby a forwarding plane of the accessible forwarding plane switch is remotely manipulated by the accessible forwarding plane controller using a standard communications protocol;
    by the conferencing server, causing the accessible-forwarding-plane controller to install a table management implementation on the accessible-forwarding-plane switch to include:
        a statically defined rule that forwards all non-conferencing traffic through a non-accessible-forwarding-plane L2/L3 switching port of the accessible-forwarding-plane switch to the L2/L3 signaling server, whereby the non-conferencing traffic is substantially undisturbed by the multimedia conferencing service, and
        a statically defined group that forwards new conferencing signaling packets to the accessible-forwarding-plane controller and to the L2/L3 signaling server, the new conferencing signaling packets being identified by determining that the new conferencing signaling packets were received at a physical port of the accessible-forwarding-plane switch that has not yet been learned as a physical port to which any conference participant client is connected;
    by the conferencing server, learning a physical port of the accessible-forwarding-plane switch to which a new conference participant client is connected based on a new signaling packet from the new conference participant client forwarded by the switch to the accessible-forwarding-plane controller and to the L2/L3 signaling server according to the statically defined group;
    establishing a signaling channel for the new conference participant client by installing a flow entry rule in the table management implementation to cause subsequent signaling packets from the new conference participant client to be directed only to the L2/L3 signaling server; and
    by the conferencing server, negotiating a media channel for the new conference participant client using the signaling channel, the media channel directing packets to a dynamic group comprising physical ports previously learned based on previous new conferencing signaling packets, the dynamic group being the only group used in forwarding conferencing media packets in a given conference, whereby a number of updates needed to add the new conference participant client is reduced.

2. The method of claim 1, wherein the subscription request additionally includes at least one of a signaling protocol, a media channel type and a selective forwarding policy.

3. The method of claim 1, further comprising:
    configuring pipelined flow tables of the accessible-forwarding-plane switch to include tagging packets with metadata identifying a conference.

4. The method of claim 1, wherein:
    only one group and one rule are updated for the new conference participant client.

5. The method of claim 1, further comprising:
    encrypting media from clients of all participants in the same conference with a shared encryption key.

6. The method of claim 1, wherein the accessible-forwarding-plane controller controls a plurality of accessible-forwarding-plane switches.

7. The method of claim 1, further comprising:
    by the conferencing server, connecting to the accessible-forwarding-plane controller to control a second accessible-forwarding-plane switch connected to conference participants local to the second forwarding plane switch, the second accessible-forwarding-plane switch being connected to the accessible-forwarding-plane plane switch via a trunk connection;

by the conferencing server, causing the second accessible-forwarding-plane switch to update a second table management implementation wherein only selected conference media traffic is forwarded via the trunk connection from the second accessible-forwarding-plane switch to the accessible-forwarding-plane switch.

8. A non-transitory computer-readable storage device having stored thereon computer readable instructions, wherein execution of the computer readable instructions by a processor causes the processor to perform operations comprising:

receiving a conference subscription request for a multimedia conferencing service including a network address of a L2/L3 signaling server;

connecting to an accessible-forwarding-plane controller to control an accessible-forwarding-plane switch, whereby a forwarding plane of the accessible forwarding plane switch is remotely manipulated by the accessible forwarding plane controller using a 9 standard communications protocol;

by the conferencing server, causing the accessible-forwarding-plane controller to install a table management implementation on the accessible-forwarding-plane switch to include:

a statically defined rule that forwards all non-conferencing traffic through a non-accessible-forwarding-plane L2/L3 switching port of the accessible-forwarding-plane switch to the L2/L3 signaling server, whereby the non-conferencing traffic is substantially undisturbed by the multimedia conferencing service, and a statically defined group that forwards new conferencing signaling packets to the accessible-forwarding-plane controller and to the L2/L3 signaling server, the new conferencing signaling packets being identified by determining that the new conferencing signaling packets were received at a physical port of the accessible-forwarding-plane switch that has not yet been learned as a physical port to which any conference participant client is connected;

learning a physical port of the accessible-forwarding-plane switch to which a new conference participant client is connected based on a new signaling packet from the new conference participant client forwarded by the switch to the accessible-forwarding-plane controller and to the L2/L3 signaling server according to the statically defined group;

establishing a signaling channel for the new conference participant client by installing a flow entry rule in the table management implementation to cause subsequent 31 signaling packets from the new conference participant client to be directed only to the L2/L3 signaling server; and negotiating a media channel for the new conference participant client using the signaling channel, the media channel directing packets to a dynamic group comprising physical ports previously learned based on previous new conferencing signaling packets, the dynamic group being the only group used in forwarding conferencing media packets in a given conference, whereby a number of updates needed to add the new conference participant client is reduced.

9. The computer-readable storage device of claim 8, wherein the subscription request additionally includes at least one of a signaling protocol, a media channel type and a selective forwarding policy.

10. The computer-readable storage device of claim 8, the operations further comprising:

configuring pipelined flow tables of the accessible-forwarding-plane switch to include tagging packets with metadata identifying a conference.

11. The computer-readable storage device of claim 8, wherein:

only one group and one rule are updated for the new conference participant client.

12. The computer-readable storage device of claim 8, wherein the accessible-forwarding-plane controller controls a plurality of accessible-forwarding-plane switches.

13. A server comprising:

a processor;

a network connection; and a computer-readable storage device having stored thereon computer readable instructions, wherein execution of the computer readable instructions by a processor causes the processor to perform operations comprising:

receiving a conference subscription request for a multimedia conferencing service including a network address of a L2/L3 signaling server;

connecting to an accessible-forwarding-plane controller to control an accessible-forwarding-plane switch, whereby a forwarding plane of the accessible forwarding plane switch is remotely manipulated by the accessible forwarding plane controller using a standard communications protocol;

by the conferencing server, causing the accessible-forwarding-plane controller to install a table management implementation of the accessible-forwarding-plane switch to include:

a statically defined rule that forwards all non-conferencing traffic through a non-accessible-forwarding-plane L2/L3 switching port of the accessible-forwarding-plane switch to the L2/L3 signaling server, whereby the non-conferencing traffic is substantially undisturbed by the multimedia conferencing service, and a statically defined group that forwards new conferencing signaling packets to the accessible-forwarding-plane controller and to the L2/L3 signaling server, the new conferencing signaling packets being identified by determining that the new conferencing signaling packets were received at a physical port of the accessible-forwarding-plane switch that has not yet been learned as a physical port to which any conference participant client is connected;

learning a physical port of the accessible-forwarding-plane switch to which a new conference participant client is connected based on a new signaling packet from the new conference participant client forwarded by the switch to the accessible-forwarding-plane controller and to the L2/L3 signaling server according to the statically defined group;

establishing a signaling channel for the new conference participant client by installing a flow entry rule in the table management implementation to cause subsequent signaling packets from the new conference participant client to be directed only to the L2/L3 signaling server; and negotiating a media channel for the new conference participant client using the signaling channel, the media channel directing packets to a dynamic group comprising physical ports previously learned based on previous new conferencing signaling packets, the dynamic group being the only group used in forwarding conferencing media packets in a given conference, whereby a number of updates needed to add the new conference participant client is reduced.

14. The server of claim 13, the operations further comprising:
configuring pipelined flow tables of the accessible-forwarding-plane switch to include tagging packets with metadata identifying a conference.

15. The server of claim 13, wherein:
only one group and one rule are updated for the new conference participant client.

* * * * *